United States Patent [19]

Yamamoto et al.

[11] Patent Number: 4,830,484
[45] Date of Patent: May 16, 1989

[54] IMAGE PROJECTION APPARATUS

[75] Inventors: Yasuhiro Yamamoto, Kiyose; Makoto Endo, Tokyo, both of Japan

[73] Assignee: Canon Kabushiki Kaisha, Tokyo, Japan

[21] Appl. No.: 122,526

[22] Filed: Nov. 18, 1987

Related U.S. Application Data

[63] Continuation of Ser. No. 804,923, Dec. 5, 1985, abandoned.

[30] Foreign Application Priority Data

| Dec. 17, 1984 | [JP] | Japan | 59-265896 |
| Apr. 4, 1985 | [JP] | Japan | 60-69960 |
| Apr. 4, 1985 | [JP] | Japan | 60-69961 |
| Apr. 4, 1985 | [JP] | Japan | 60-69962 |

[51] Int. Cl.$^4$ .......................................... G03B 23/08
[52] U.S. Cl. ................................. 353/25; 353/27 A
[58] Field of Search ................. 353/25, 26 R, 26 A, 353/27 R, 27 A, 95, 22, 23; 355/40, 41, 18; 360/96.6

[56] References Cited

U.S. PATENT DOCUMENTS

| 3,722,991 | 3/1973 | Edhlund | 353/27 A |
| 3,743,399 | 7/1973 | Smith | 353/27 R |
| 4,072,860 | 2/1978 | Koleff et al. | 353/27 A |
| 4,549,797 | 10/1985 | Sawano et al. | 353/27 A |
| 4,578,787 | 3/1986 | Shimizu et al. | 369/77.2 |

FOREIGN PATENT DOCUMENTS 0094749  5/1984  Japan ................. 353/27 R

Primary Examiner—William A. Cuchlinski, Jr.
Assistant Examiner—Patrick R. Scanlon
Attorney, Agent, or Firm—Fitzpatrick, Cella, Harper & Scinto

[57] ABSTRACT

An image projection apparatus detects whether or not a film sheet such as a microfiche is clamped between a pair of transparent members upon energization of the apparatus, performs index frame projection when the film sheet is clamped therebetween, and performs ejection when the film sheet is not clamped therebetween, thereby preventing damage to the film sheet and the jam state.

19 Claims, 13 Drawing Sheets

IMAGE PROJECTION APPARATUS

This application is a continuation of application Ser. No. 804,923 filed Dec. 5, 1985, now abandoned.

BACKGROUND OF THE INVENTION

1. Field of the Invention

The present invention relates to an image projection apparatus for projecting an image recorded in a film sheet such as a microfiche onto a screen, a photosensitive body or the like.

2. Description of the Prior Art

In a conventional apparatus of this type, a carrier consists of a right-and-left moving member and a back-and-forth moving member placed thereon, and movement of the carrier is controlled. A microfiche is set on the carrier and is moved two-dimensionally, and a desired one of the microimages formed in a matrix form on the microfiche is retrieved in response to a predetermined address and is located on an optical path of a projection optical system.

At the time of replacement of one microfiche F with another, when an operator depresses an eject key on a keyboard, the movement control device is actuated to move the carrier to the eject position so as to easily access the microfiche. An upper transparent plate holding the microfiche F is opened by an opening/closing mechanism and is kept in an open position.

In this state, the operator removes the used microfiche and inserts a new one. The operator enters a command at the keyboard to close the transparent plate, so that the control device causes the carrier to return to the base position Thereafter, predetermined address access is performed.

When the operator removes the microfiche at the eject position and does not load a new microfiche there, the operator must enter the command for closing the transparent plate and turn off the power switch.

On the other hand, when the operator loads a new microfiche and continues projection, the operator does not forget entering the command for closing the upper transparent plate since the new microfiche must be clamped between a pair of transparent plates.

However, at the end of operation, the operator often forgets to close the upper transparent plate and simply turns off the power switch. The upper transparent plate is thus kept open. In this state, the operator may erroneously depress the upper transparent plate to act an excessive force onto the transparent plate or its opening/closing mechanism to result in decisive damage thereto. Furthermore, when the pair of transparent plates are kept open for a long period of time, a foreign material such as dust enters therebetween. At the subsequent retrieval, a projected image and a print image obtained by copying the projected image are degraded due to the presence of the foreign material. In addition, the foreign material causes incomplete contact between the microfiche and the pair of upper and lower transparent plates and this may lead to a focusing error. In the worst case, the microfiche is scratched.

Even if the upper transparent plate is kept open while the operation has not been performed for a long period of time and the power switch has been kept off, the problem described above also occurs.

The upper transparent plate is kept open for a long period of time mostly when the operator forgets to turn off the power switch after the used microfiche is ejected. Power consumption is wasted, and lifetime of the projection lamp or the like is shortened.

Furthermore, when the previous user turns off the power switch while the used microfiche is left between the upper and lower transparent plates, the subsequent user does not know that a microfiche is left between the transparent plates. The subsequent user inserts a new microfiche between the upper and lower transparent plates and forcibly squeezes the previous microfiche into a connecting portion between the upper and lower transparent plate, resulting in jam or damaging the previous microfiche.

SUMMARY OF THE INVENTION

It is an object of the present invention to eliminate the conventional drawbacks described above and to prevent operator's errors.

It is another object of the present invention to provide an image projection apparatus wherein even if an upper transparent plate is kept open due to carelessness of an operator or the like, the upper transparent plate is automatically returned to a closed position, so that damage to the upper transparent plate which is kept open, degradation of a projected image by a foreign material, focusing errors and damage to a film sheet such as a microfiche can be prevented, and that power consumption is not wasted.

It is still another object of the present invention to provide an image projection apparatus for detecting whether or not a film sheet such as a microfiche is clamped between a pair of transparent members upon energization of the apparatus, for performing index frame projection when the film sheet is clamped therebetween, and for performing ejection when the film sheet is not clamped therebetween, thereby preventing damage to the film sheet and the jam state.

DESCRIPTION OF THE PREFERRED EMBODIMENTS

Embodiments of the present invention will be described with reference to the accompanying drawings.

Figure 1:
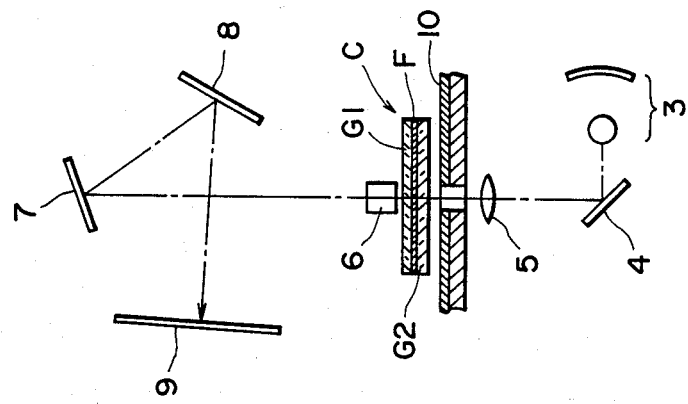
FIG. 1 is a sectional view of a projection optical system according to an embodiment of the present invention.

FIG. 1 shows a projection optical system for a microfiche F. A light source 3 consists of a lamp and a reflector. The projection optical system also comprises a reflecting mirror 4, a condenser lens 5, a focusing lens 6, reflecting mirrors 7 and 8, and a screen 9.

The microfiche F is placed between the lenses 5 and 6 and is moved by a carrier C. The focusing lens 6, the reflecting mirrors 7 and 8, and the screen 9 are arranged in a black box. The projection optical path can be guided in a copying machine to constitute a printer.

Figure 2:
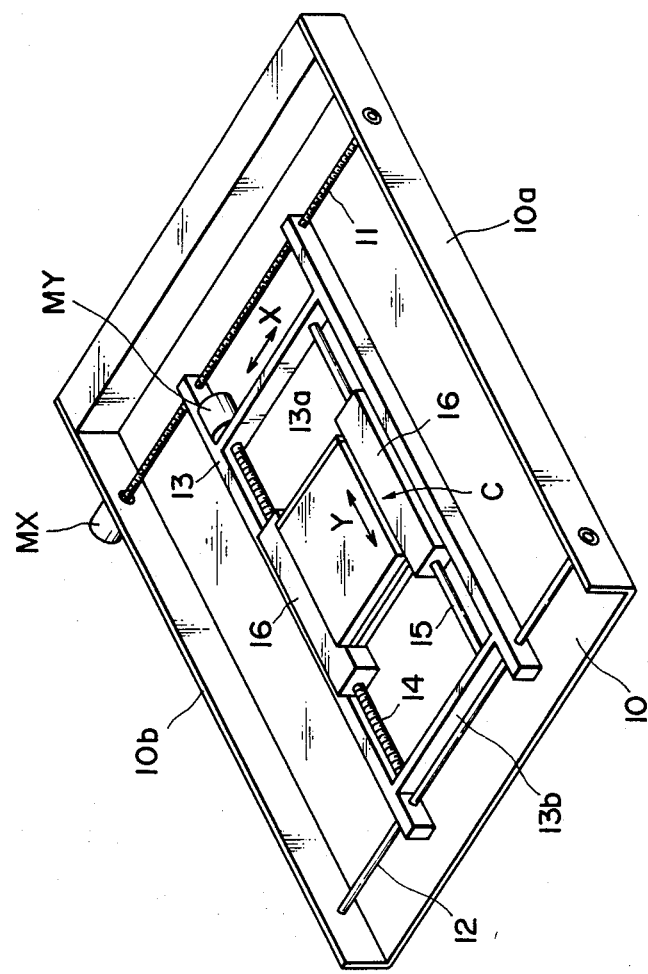
FIG. 2 is an enlarged perspective view of a carrier mechanism.

FIG. 2 shows a device for two-dimensionally (i.e., X and Y directions) moving the carrier C. A chassis 10 is fixed in an apparatus housing (not shown). The chassis 10 has right and left side walls 10a and 10b. A screw rod 11 is rotatably mounted between the rear portions of the right and left side walls along the right-and-left direction (X direction). A guide rail 12 is mounted in the front portions of the right and left side walls 10a and 10b and is parallel to the screw rod 11. The rear portion of an elongated first carrying member 13 is threadably engaged with the screw rod 11, and the front portion thereof is slidably engaged with the guide rail 12. A X-direction driving motor MX such as a reversible pulse motor drives the screw rod 11.

A screw rod 14 is rotatably mounted near the left frame member between a rear transverse frame member 13a and a front transverse frame member 13b of the first carrying member 13 and extends along the back-and-forth direction (Y direction). A guide rail 15 is mounted near the right frame member of the first carrying member 13 and is parallel to the screw rod 14 The left frame member of a second carrying member 16 is threadably supported by the screw rod 14 and the right frame member thereof is slidably supported by the guide rail 15. A Y-direction driving motor MY comprises a reversible pulse motor and is mounted on the first carrying member 13.

A lower transparent plate G2 for clamping the microfiche F is affixed on the rectangular second carrying member 16. An upper transparent plate G1 has a bearing member 17 and is mounted to a bearing member 18 through a shaft 2, so that the upper transparent plate G1 is pivotal about the shaft 2 and is opened/closed. The members 13 and 16 to 18 constitute the carrier C.

An inclined cam 1 is mounted on the first carrying member 13 such that the transparent plate G1 is opened when the carrier C reaches the front eject position with respect to the first carrying member 13. A friction reducing roller 20 is mounted on the bearing member 17 of the upper transparent plate G1 and is in rolling contact with the inclined cam 1.

Figure 3:
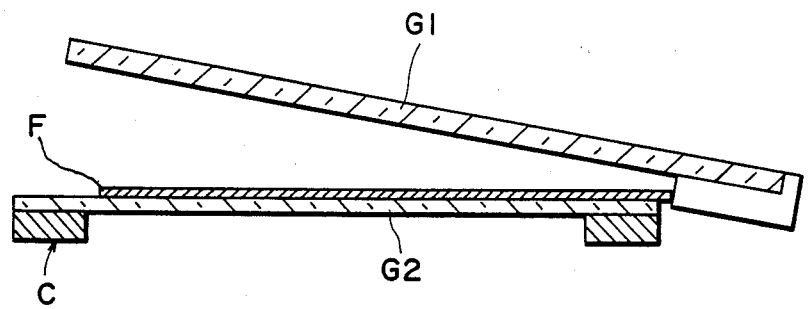
FIG. 3 is a sectional view showing a state wherein upper and lower transparent plates of a microfiche carrier are open.
Figure 4:
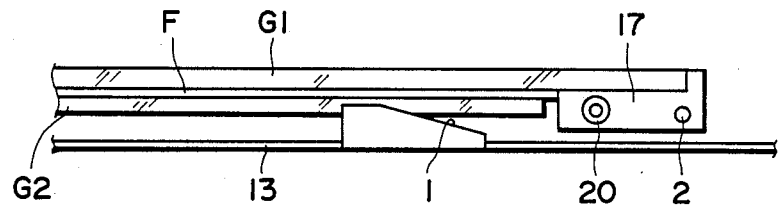
FIG. 4 is a sectional view showing a state wherein the upper and lower transparent plates of the microfiche carrier are closed.
Figure 5:
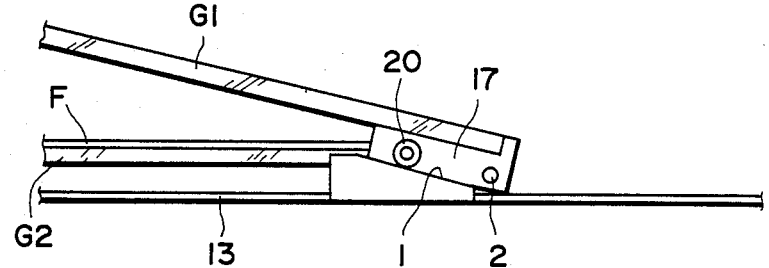
FIG. 5 is a side view of an upper transparent plate opening mechanism.

When the operator depresses an eject key at the keyboard to generate a command for opening the upper transparent plate G1, the carrier C moves the first carrying member 13 to the operator-side (the front side of FIG. 2) eject position (a first position). The roller 20 ascends the inclined cam 1 again, so that the upper transparent plate G1 is pivoted upward and is opened in a state shown in FIGS. 3 and 5. When the carrier C is moved to a base position (a second position), the upper transparent plate G1 is closed, as shown in FIG. 4.

Figure 6:
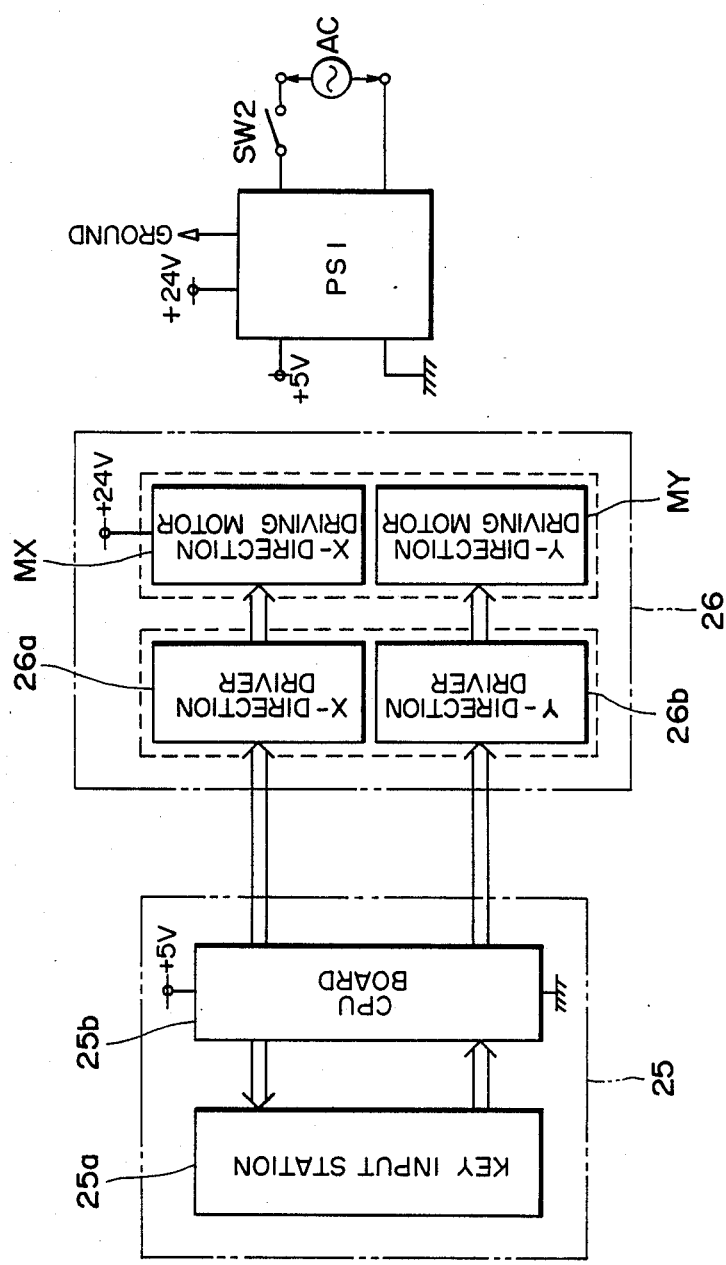
FIG. 6 is a block diagram of an electric circuit of a microfiche carrier drive device.

FIG. 6 is a block diagram of a microfiche drive device for performing retrieval operation described above. A keyboard 25 has a key input unit 25a and a CPU board 25b. A drive unit 26 has X- and Y-direction drivers 26a and 26b, and X- and Y-direction driving motor MX and MY. A power source PS1 transforms an AC voltage to DC 5 V and DC 24 V. The DC voltage of 5 V is supplied to the CPU board 25b, and the DC voltage of 24 V is supplied to the motors MX and MY for driving the carrier C.

When the operator depresses a desired key in the key input unit 25a to generate a corresponding command, the CPU board 25b is operated to drive the drive unit 26 in accordance with a known program.

When the operator completes the retrieval operation in the conventional apparatus, he turns off a power source switch SW2. Therefore, the power source PS1 may be disconnected irrespective of the state of the carrier C, so that the upper and lower transparent plates G1 and G2 are kept open as previously described.

According to this embodiment, a power source remote switch SW1 is arranged in the key input unit 25a. When the power source remote switch SW1 is closed so as to disconnect the power source, the closed state of the switch SW2 is detected by the CPU board 25b. If the transparent plate G1 is kept open, the drive unit 26 is controlled and moved to the position (i.e., normally the base position of the carrier) where the transparent plate G1 is closed. Thereafter, the power source PS1 is disconnected, so that all the power is cut off from the retrieval unit and the reader.

However, in case that the upper transparent plate G1 is closed when the power source remote switch SW1 is closed, the power source PS1 is immediately disconnected from the retrieval unit. As a result, the upper transparent plate G1 will not be kept open.

Figure 7:
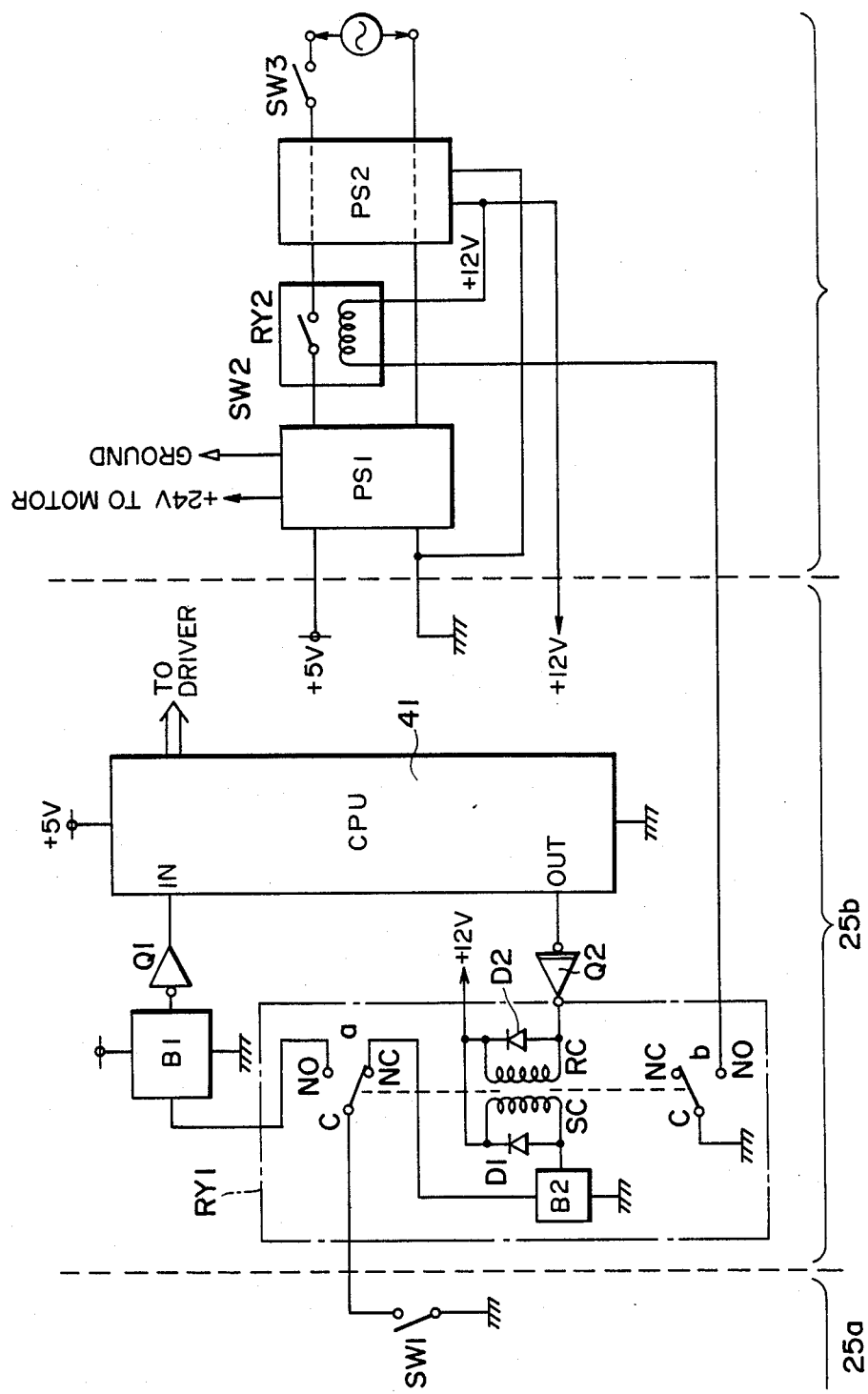
FIG. 7 is a block diagram showing a detailed arrangement of the device of FIG. 6.

FIG. 7 is a detailed block diagram of the microfiche retrieval apparatus shown in FIG. 6. The apparatus has the power source remote switch SW1. A second power source PS2 transforms an AC voltage to a DC voltage of 12 V. A current corresponding to the DC voltage from the second power source PS2 turns on/off an AC relay RY2 corresponding to the power source switch SW2 of FIG. 1.

The power source PS2 is disconnected by a switch SW3 when the retrieval apparatus is not used for a long period of time. However, in normal operation, the switch SW3 is closed to supply the DC voltage of +12 V to a latching relay RY1 (to be described below).

The latching relay RY1 has first and second switching contacts a and b, a set coil SC and a reset coil RC. The power source remote control switch SW1 is connected to a terminal c of the first switching contact a The coil of the power source switch SW2 (i.e., the AC relay RY2) is connected to the +12 V terminal of the second power source PS2 and the NO terminal of the second contact b of the latching relay RY1. The DC voltage of +12 V is supplied to the set and reset coils SC and RC in parallel with the coil circuit described above.

When the above arrangement, it is assumed that the switch SW2 of the first power source PS1 for supplying the DC voltages of +5 V and +24 V is opened by the AC relay RY2. In this state, when the operator depresses the power source remote switch SW1 on the keyboard, the first contact a of the latching relay RY1 is located in the normally open contact NC side while the first power source PS1 is disconnected. A current thus flows from the second power source PS2 to the set coil SC. The first and second contacts a and b of the latching relay RY1 are switched over to the normally open contact NO side.

A current corresponding to the DC voltage of +12 V from the second power source PS2 flows across the coil of the AC relay RY2 through the b-NO path. The contact, i.e., the switch SW2 is closed. The power source PS1 is connected to the AC power source, so that the DC voltage of +5 V is supplied to the CPU board and the DC voltage of +24 V is supplied to the carrier drive unit 26. A CPU 41 is operated in response to the input from the key input unit 25a, so that a control signal is supplied to the drive unit 26, thereby driving the carrier C.

Figure 8:
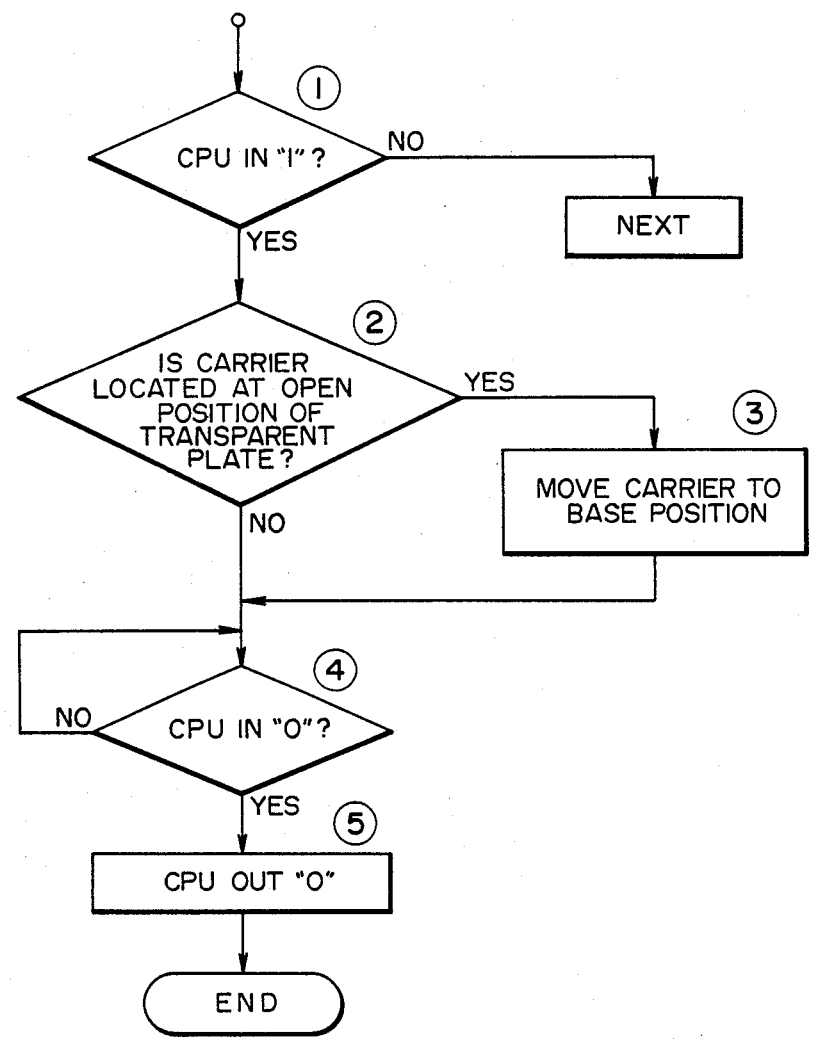
FIG. 8 is a flow chart for explaining the operation of the device of FIG. 6.

When the remote switch SW1 is depressed to open the power source switch SW2 for the power source PS1 upon completion of the retrieval operation, the first contact a of the latching relay RY1 is in contact with the NO terminal, and an input port IN of the CPU 41 is changed from logic "0" to logic "1" (step ① of FIG. 8). It should be noted that a buffer B1 includes a resistor, a diode, a capacitor and an inverter Q1. In this case, when the carrier position corresponds to the transparent open position (eject position), the CPU 41 supplies a control signal to the X- and Y-direction drivers 26a and 26b. The carrier C is moved so as to close the upper transparent plate G1 to the base position (step ③ in FIG. 8). The upper transparent plate plate G1 is separated from the cam 1 of FIG. 5 and is then closed.

When the carrier C is moved to the base position and the operator releases the power source remote switch SW1, the input port IN of the CPU 41 is changed from logic "1" to logic "0" (step ④). An output port OUT of the CPU 41 which is normally set at logic "1" goes to logic "0" (step ⑤). In this state, a current flows in the reset coil RC of the latching relay RY1 through a driver Q2, so that the first and second contacts a and b of the latching relay RY1 are switched to the NC side. The coil circuit of the AC relay RY2 is disconnected through the b-NC path, add the power source switch SW2 is opened. As a result, the power source PS1 is disconnected. The circuit shown in FIG. 7 also has a buffer B2 and surge absorbing diodes D1 and D2.

The CPU 41 checks in step ② whether or not the carrier is located at the open position of the transparent plate. If NO in step ②, the flow advances to step ④. The power switch SW2 is opened upon the above operation, and the power source PS1 is disconnected. In this case, the power source PS1 is disconnected immediately after the operator releases the power source remote switch SW1.

When the power source switch is turned off while the upper and lower microfiche clamping transparent plates are open, power is turned off after the carrier is moved and the transparent plates are closed. The transparent plates will not therefore be kept open for a long period of time. Damage to the transparent plates or the carrier, degradation of the image due to attachment of dust to the transparent plates, focusing errors and the damage to the microfiche are prevented.

Figure 9:
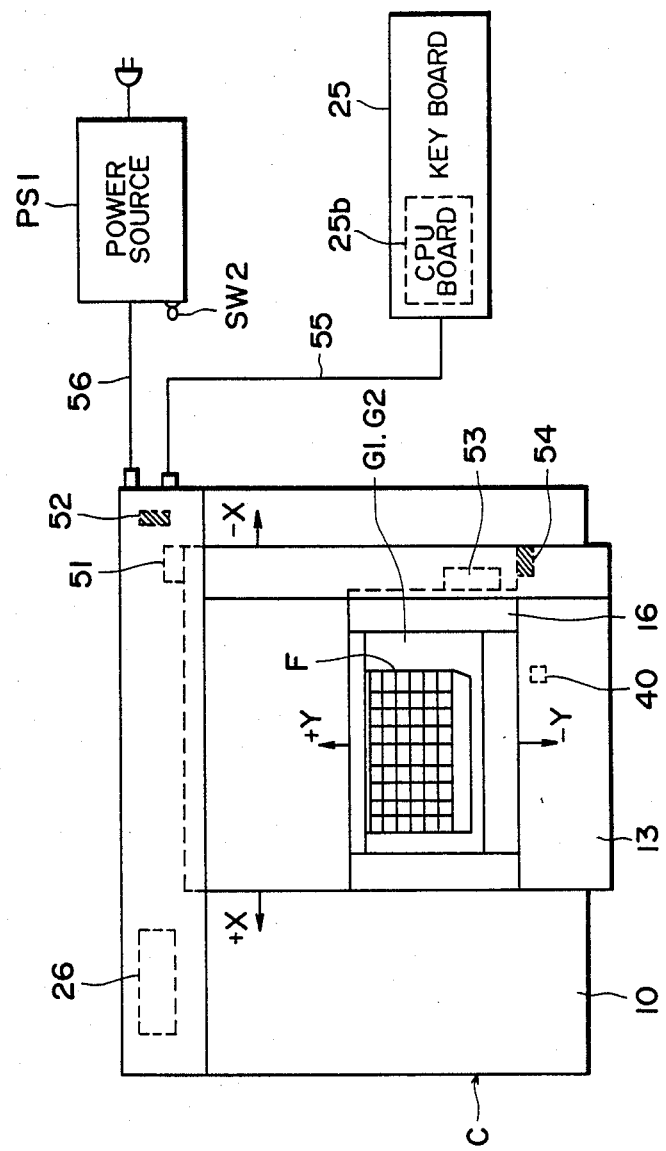
FIG. 9 is a plan view of a microfiche retrieval device according to another embodiment of the present invention.
Figure 12:
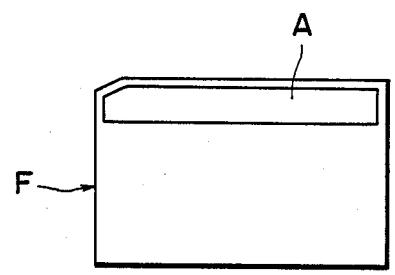
FIG. 12 is a plan view of a microfiche.

FIG. 9 shows another embodiment of the microfiche retrieval apparatus. The same reference numerals in this embodiment denote the same parts as in the previous embodiment. A keyboard 25 and a power source PS1 are connected to a carrier C through cables 55 and 56. A reflection photosensor 40 is arranged on the lower surface of a lower transparent plate G2. The photosensor 40 serves as a detecting means for detecting the presence/absence of a microfiche clamped between the upper and lower transparent plates G1 and G2. The reflection photosensor 40 is arranged at a position where a heading area A (having a low intensity of light reflected by the heading area A) written with a heading of the microfiche F can be detected, as shown in FIG. 12, upon movement of first and second carrying members 13 and 16 to the eject position.

When the second carrying member 16 is moved in the −Y direction, an upper transparent plate G1 is gradually opened from a given location. When the second carrying member 16 reaches the front end along the −Y direction, the plate G1 is completely opened (this position is called the eject position). When the second carrying member 16 is moved from the front end of the −Y direction along the +Y direction, the upper transparent plate G1 reaches the closed position. In this case, the operator can replace the microfiche F with another, or eject the microfiche F from or insert it in the lower transparent plate G2.

An X- direction base position detecting member 51 is integrally mounted with the first carrying member 13, and an X-direction sensor 52 is mounted on a carrier chassis 10 to detect the position of the X-direction base position detecting member 51. Similarly, a Y-direction base position detecting member 53 is integrally mounted with the second carrying member 16, and a Y-direction sensor 54 is mounted on the first carrying member 13 to detect the position of the Y-direction base position detecting member 53.

A drive unit 26 is also mounted on the carrier chassis 10. The drive unit 26 has X- and Y-direction motors MX and MY to drive the first and second carrying members 13 and 16. The X- and Y-direction sensors 52 and 54 are connected to a CPU board 25b as a controlling means in the keyboard 25 through the cable 55. The drive unit 26 drives X- and Y-direction motors MX and MY in response to drive pulses and direction switching signals from the CPU board 25b.

Figure 10:
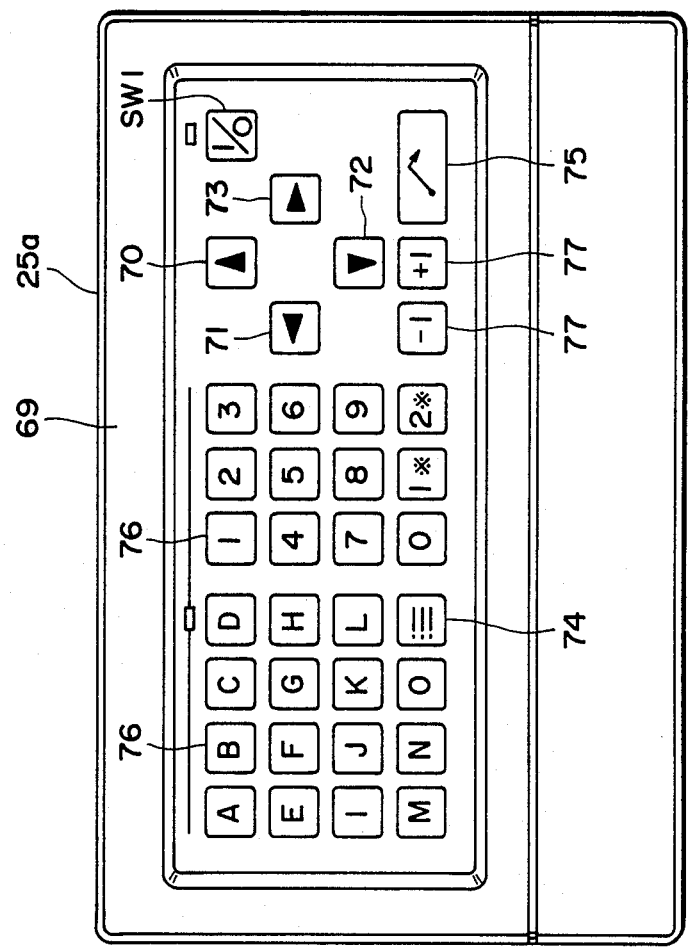
FIG. 10 is a plan view of a key input unit.
Figure 11:
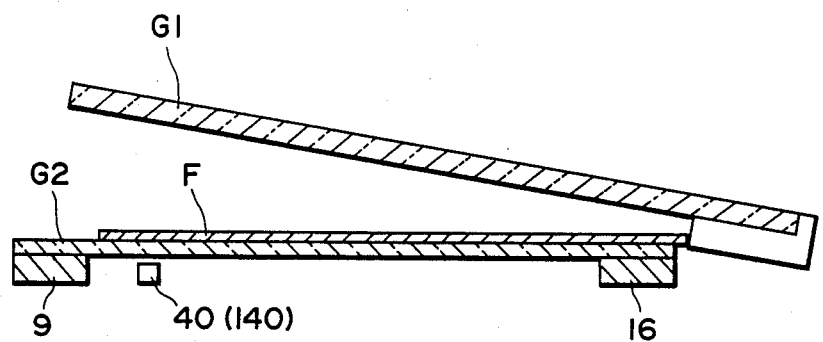
FIG. 11 is a sectional view showing a state wherein an upper transparent plate is open.
Figure 13:
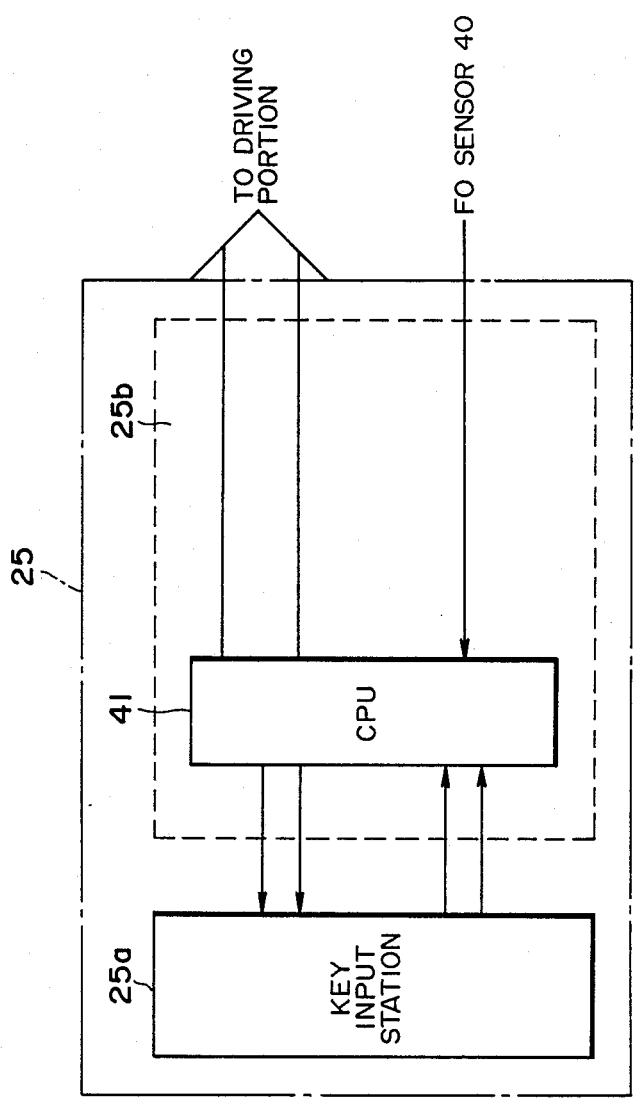
FIG. 13 is a block diagram of the key input unit of FIG. 10.

The key input unit 25a has various keys as the frame designating means on its panel 69, as shown in FIG. 10. Among these keys, keys 70 to 73 serve as fine adjustment keys. Upon selective depression of the fine adjustment keys 70 to 73, the CPU board 25a supplies signals to the drive unit 26 to slightly drive the first or second carrying member 13 or 16 in a direction opposite to the direction indicated by the arrow. An index key 74, an eject key 75, an address designating key 76, a one frame feed key 77 and a power source remote control switch SW1 (to be described later) are arranged on the panel 69 of the key input unit 25a. The block diagram of the keyboard 25 is illustrated in FIG. 13. The keyboard 25 mainly comprises the CPU board 25b and the key input unit 25a, as shown in FIG. 13. A CPU 41 is arranged in the CPU board 25b. The CPU 41 controls key scanning and supplies drive signals to the X- and Y-direction motors. The key input unit 25a has various keys 70, 71, . . . which are connected to the CPU 41.

DC output voltages (+5 V and +24 V) from the power source PS1 are supplied to the carrier C, the drive unit 26 and X- and Y-direction sensors 52 and 54. The voltage (+5 V) is supplied to the CPU board 25b in the keyboard 25 through the cable 55. A power source switch SW2 is arranged in the power source PS1.

Figure 15:
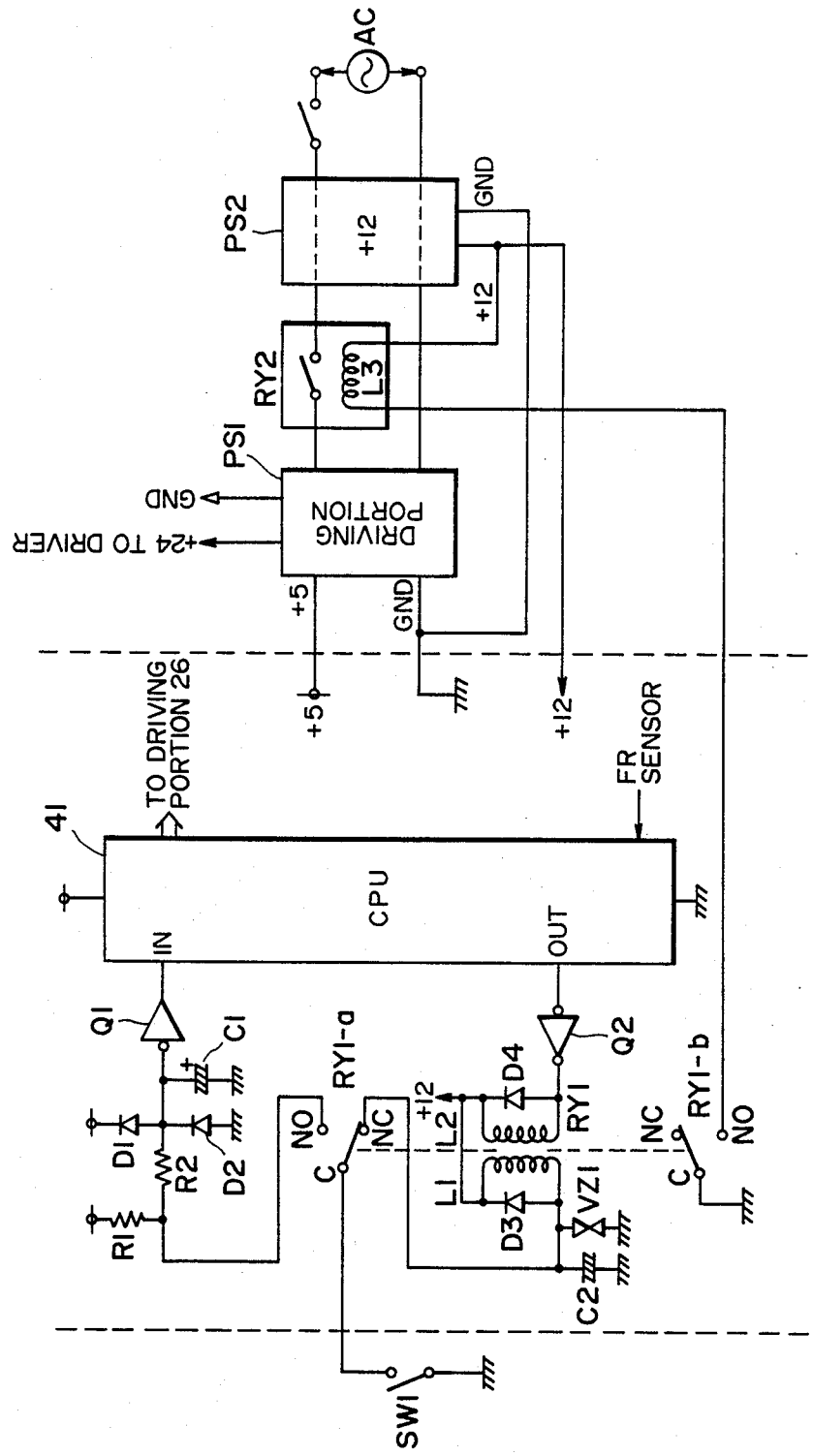
FIG. 15 is a detailed block diagram of a carrier drive device.

FIG. 15 is a circuit diagram of the controller of the microfiche retrieval apparatus. The C terminal of a contact RY1-*a* of a latching relay RY1 which can be held in the set and reset states in response to the set and reset pulses is connected to the power source remote control switch SW1 arranged in the key input unit 25*a*. In the reset state, contacts RY1-*a* and RY1-*b* are located in the NC position. A buffer consisting of resistors R1 and R2, diodes D1 and D2, a capacitor C1, and an inverter Q1 is connected to the NO side of the contact RY1-*a* of the latching relay RY1. The output terminal of the inverter Q1 is connected to the CPU 41. The NC side of the contact RY1-*a* of the latching relay RY1 is connected to one end of a set coil L1, and the other end thereof is connected to the 12 V power source. A noise and chattering absorbing capacitor C2 and a surge absorber VZ1 are connected between ground and the NC side of the contact RY1-*a* of the latching relay RY1. A driver Q2 is connected to an output terminal of the CPU 41. The output terminal of the driver Q2 is connected to one end of a reset coil L2 of the latching relay RY1. The other end of the reset coil L2 is connected to the +12 V power source. Surge absorbing diodes D3 and D4 are connected between the terminals of the set and reset coils L1 and L2 of the latching relay RY1. On the other hand, the C terminal of the contact RY1-*b* of the latching relay RY1 is connected to GND. The NO terminal is connected to one end of a coil L3 of an AC relay coil RY2. The other end of the coil L3 is connected to the +12 V power source. A DC +12 V power source PS2 is connected to an AC power source AC through the switch SW2. The AC power source AC is also connected to the DC +5 V and +24 V power source PS2 through the contact of the AC relay RY2. The voltage of +5 V and +24 V are supplied to the CPU board 25*b*. The voltage of +24 V is supplied as the X and Y-direction motor drive power source voltage. The switch SW2 is normally ON. When the apparatus is not used for a long period of time, the switch SW2 is turned off, thereby disconnecting the +12 V power source.

In the microfiche retrieval apparatus having the arrangement described above, microfiche retrieval is performed in the following manner. When the power switch is kept OFF (however, the power source switch SW2 is kept ON), the power source PS1 for supplying voltages of +5 V and +24 V is disconnected by the AC relay RY2, as shown in FIG. 15. When the operator depresses the power source remote switch SW1 on the key input unit 25*a*, a current flows in the set coil L1 of the latching relay RY1 since the contact RY1-*a* thereof is held in the NC position. The contacts RY1-*a* and RY1-*b* of the latching relay RY1 are brought into the NO position so that a current flows in the coil L3 of the AC relay RY2, and the contacts are closed. The power source PS1 for +5 V and +24 V is held ON. Furthermore, since the latching relay contact RY1-*a* is brought into contact with the NO position, an input port IN of the CPU 41 is changed from logic "0" to logic "1".

When the power source remote switch SW1 is depressed while the power switch is held ON, the input port IN of the CPU 41 is held in logic "1" since the latching relay contact RY1-*a* is located in the NO side. In this case, the CPU 41 supplies a control signal to the drive unit 26 to move the first and second carrying members 13 and 16 to the base position. When the first and second carrying members 13 and 16 reach the base position, the input port IN of the CPU 41 is changed from logic "1" to logic "0", and at the same time an output port OUT of the CPU 41 goes to logic "0" (the output port is held in logic "1" in normal operation). A current flows in the reset coil L2 of the latching relay RY1, and the contacts RY1-*a* and RY1-*b* are switched to the NC position to open the contact of the AC relay RY2. The power source PS1 is turned off.

As described above, upon depression of the power source remote switch SW1 in the key input unit 25*a*, the power source PS1 is held ON, and the CPU 41 is turned on to move the first and second carrying members 13 and 16 to the base position. The CPU 41 determines the moving directions in accordance with whether or not the X- and Y-direction base position detecting members 51 and 52 partially overlap the X- and Y-direction sensors 52 and 54, respectively. If the first and second carrying members 13 and 16 are located in positions indicated in FIG. 9, i.e., when the X- and Y-direction base position detecting members 51 and 53 do not overlap the X- and Y-direction sensors 52 and 54, respectively, the first and second carrying members 13 and 16 are moved along the -X and -Y directions. When the detecting members 51 and 53 partially overlap the sensors 52 and 54, respectively, the first and second carrying members 13 and 16 are stopped.

When the first and second carrying members 13 and 16 reach the base position, the CPU accepts an input at the key input unit 25*a*. (It should be noted that inputs from the fine adjustment keys 70 to 73 and the one frame feed key 77 cannot be accepted.)

When the eject key 75 is depressed, a control signal is supplied from the CPU 41 to the drive unit 26, so that the second carrying member 16 is moved to the eject position and thus the upper transparent plate G1 is opened. The operator sets a desired microfiche F at a predetermined position on the lower transparent plate G2. Subsequently, when the operator depresses the index key 74, the upper transparent plate G1 is closed, and the first and second carrying members 13 and 16 are moved to locate the index frame of the microfiche F to the projection position. When the operator then depresses the address designation key 76 to designate an address, the first and second carrying members 13 and 16 are moved to locate the accessed frame to the projection position. Address designation is performed in the following manner. When an address designation key "9" is depressed, the ninth column of the microfiche is moved to the projection position. When the address designation key "E" is depressed, the row E of the microfiche F is moved to the projection position. Therefore, the frame at the 9th column and the row E is moved to the projection position.

When the operator selectively depresses the fine adjustment keys 70 to 73, the first and second carrying members 13 and 16 are moved at a very low speed in directions opposite to the directions indicated by corresponding arrows. It should be noted that an image projected and displayed on the screen is moved in the same directions as those indicated by the arrows.

When the operator depresses the one frame feed key 77 in the key input unit 25*a*, the frames can be fed one by one. Furthermore, when the operator depresses the eject key 75, the second carrying member 16 is moved to the eject position, and the upper transparent plate G1 is opened. The operator then removes the microfiche F and can replace the current microfiche with another.

When the operator depresses the eject key 75 to remove the microfiche F, the CPU 41 causes the first and second carrying members 13 and 16 to move to the eject position, so that the upper transparent plate G1 is opened. In this state, the reflection photosensor 40 checks the presence/absence of the microfiche F. A detection signal from the reflection photosensor 40 is supplied to the CPU 41. The CPU 41 performs the following operation in response to the film absence signal from the reflection photosensor 40. When the eject key 75 is depressed, the CPU 41 causes a software timer therein to start counting until a key (the index key, the address designation key, the one frame feed key, or the like) excluding the fine adjustment keys 70 to 73 is depressed. When the count of the software timer falls within the predetermined value, the count is reset and the operation is performed in accordance with the depressed key. However, when the predetermined period of time corresponding to the preset count value has elapsed and the upper transparent plate G1 is not closed, the open upper transparent plate G1 is closed, and the first and second carrying members 13 and 16 are returned to the base position. When another key is depressed, the operation corresponding to the depressed key is started.

Figure 14:
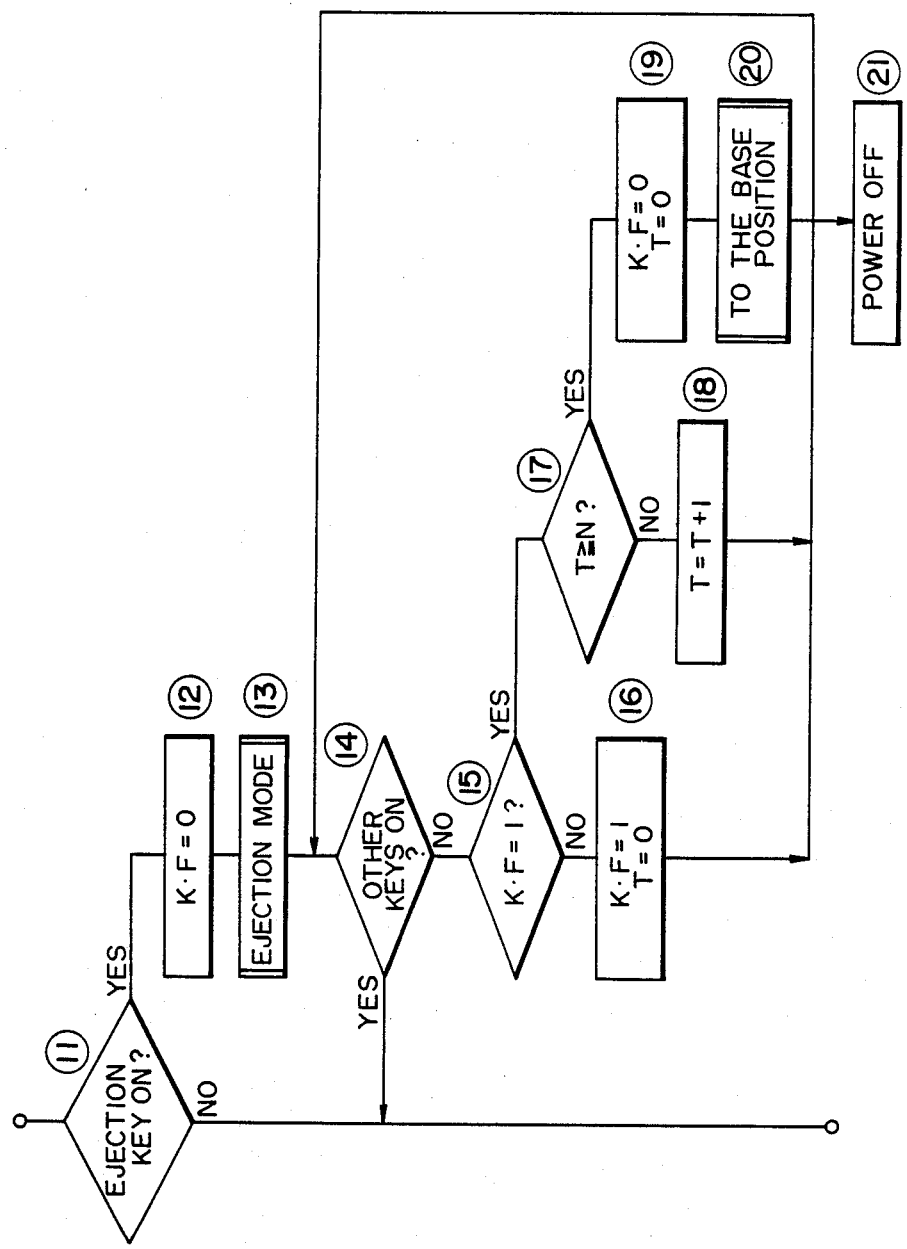
FIG. 14 is a flow chart for explaining the program executed by a keyboard CPU.

The CPU 41 is operated in accordance with the flow chart of FIG. 14 The CPU checks in step ⑪ whether or not the eject key 75 is depressed. If YES in step ⑪, a key flag K·F is cleared (step ⑫), and the upper transparent plate G1 is opened in the eject mode (step 13). The CPU 41 then checks in step ⑭ whether or not a key excluding the eject and fine adjustment keys is depressed. If YES in step ⑭, a timer count T is reset, and the next mode is immediately set. However, if NO in step ⑭, the flow advances to step ⑮. In this case, since K·F=0 has been set in step ⑫, the flow advances to step ⑯. In step ⑯, the key flag K·F is set at logic "1", and the timer count T is cleared. Thereafter, the flow returns to step ⑭. When the CPU 41 determines in step ⑭ that any key excluding the eject and fine adjustment keys is not depressed, the key flag K·F is set at logic "1" in step ⑮. Therefore, the flow advances to step ⑰. In step ⑰, the CPU 41 compares the timer count T with the preset value N corresponding to the preset timer time. Since T<N is established, the flow advances to step ⑱, and the timer count T is incremented by one. The flow then returns to step ⑭. When the preset timer time has elapsed after repetition of the operations between steps ⑭ to ⑱, condition T≧N is established. The key flag K·F and the timer count T are cleared in step ⑲. In step ⑳, the CPU 41 drives the driver 57 and the drive unit 26 to move the first and second carrying members 13 and 16 to the base position. The CPU 41 generates a signal of logic "0" at its output port OUT, and the power source is disconnected (step ㉑. In this case, since the base position corresponds to the closing position of the upper transparent plate G1, the upper transparent plate G1 is set in the closed position upon movement of the first and second carrying members 13 and 16 to the base position. The timer reset time can be arbitrarily selected and can be set to be about 10 minutes. When the power source remote switch SW1 is depressed before the predetermined period of time elapses, the first and second carrying members 13 and 16 are returned to the base position and the power source is turned off, as described above.

When the CPU 41 receives a film presence signal from the reflection photosensor 40 while the upper transparent plate G1 is open, the CPU board 25 does not cause the power source to turn off even if the predetermined period of time has elapsed or the power source remote control switch SW1 is depressed. In this case, the first and second carrying members 13 and 16 are moved to the base position. Thereafter, the power is not turned off.

In the above embodiment, the timer time is set in the software timer in the CPU 41. However, the timer time setting is not limited to that in the software timer. The timer time can be preset by a hardware timer.

The above operation exemplifies the case wherein the first and second carrying members are returned to the base position when the timer time has elapsed. However, as long as the upper transparent plate G1 is located in the closed position, the first and second carrier members 13 and 16 can be returned to any position. For example, the first and second carrier members 13 and 16 can be returned to positions where the index frame or a frame at address A1 is located to the read position.

In the above embodiment, the power source is not turned off when a microfiche F is plated on the lower transparent member G2. However, the power source can be turned off when the power source remote switch SW1 is turned off.

In the above embodiment, the presence/absence of the microfiche F is detected by the reflection photosensor 40. However, the microfiche F can be detected by a transmission photosensor or a light-receiving element for receiving light from another light source. Furthermore, a projection lamp may be used as a light source, and a sensor may be arranged in the reader or printer to detect an enlarged image, thereby detecting the presence/absence of the microfiche F. Alternatively, a microswitch may be used to detect the presence/absence of the microfiche F. In this case, the microswitch may be turned o upon insertion of the microfiche F or by the weight of the microfiche F.

The present invention has the above arrangement and operation mode. Even if the operator carelessly forgets to close the transparent plate and turn off the power switch, the transparent plate is automatically closed and the power switch is automatically turned off after predetermined period of time. Therefore, an accident in which the next operator forcibly depresses and damages the open upper transparent plate is not caused. Degradation of the projected image which is caused by an insertion of the foreign material can be prevented. Focusing errors can also be prevented. A film sheet such as a microfiche is not damaged by any foreign material. Furthermore, power consumption can be decreased. The present invention is not limited to apparatuses using microfiches, but can be extended to apparatuses using other film sheets such as aperture cards and strip films.

Figure 16:
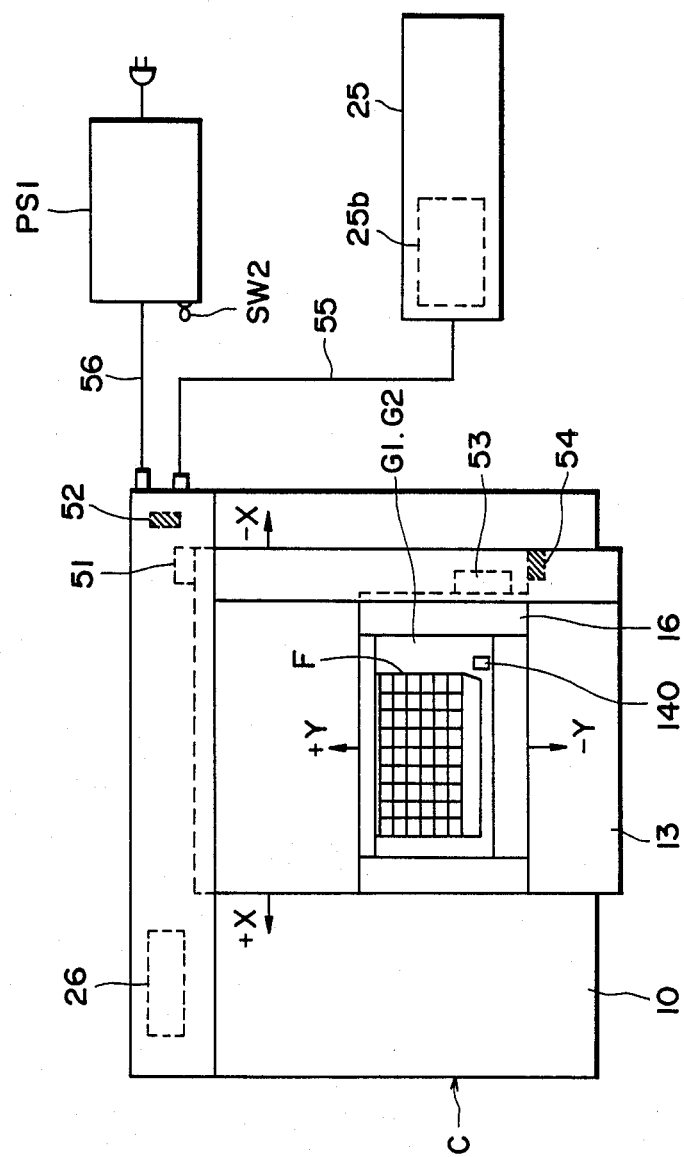
FIG. 16 is a plan view of a microfiche retrieval apparatus according to still another embodiment of the present invention.

FIG. 16 shows still another embodiment of the present invention. Referring to FIG. 16, a reflection photosensor for detecting the presence/absence of a microfiche is arranged in a position different from that of FIG. 9. More specifically, a reflection photosensor 140 is arranged at a position where a heading area A (FIG. 12) (a low intensity of light reflected by the heading area A) having a heading of the microfiche F can be detected when first and second carrying member 13 and 16 are moved to the base position upon energization of the microfiche retrieval apparatus.

Figure 17:
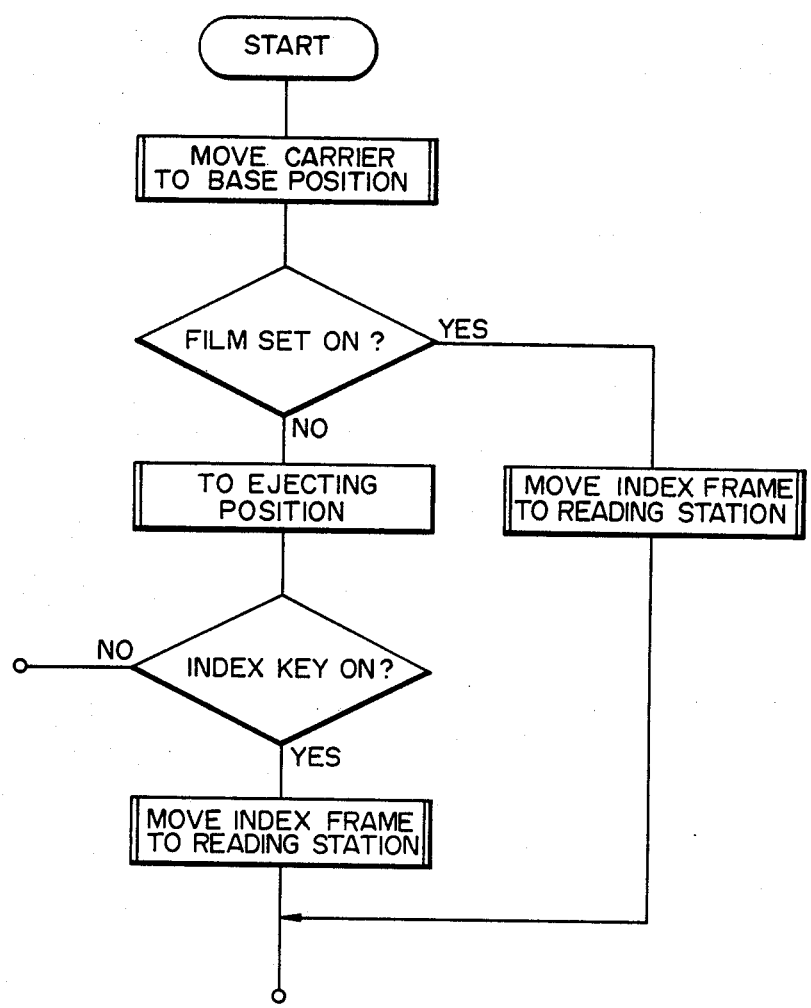
FIG. 17 is a flow chart for explaining the operation of the apparatus in FIG. 16.

When the operator depresses a power source remote switch SW1 to cause the microfiche retrieval apparatus of FIG. 16 to perform microfiche retrieval, a CPU 41 is operated in accordance with the flow chart of FIG. 17. When the power source remote switch SW1 is depressed, the CPU 41 causes the first and second carrying members 13 and 16 to move to the base position. In this case, the reflection photosensor 140 detects whether or not the microfiche F is present between the upper nd lower transparent plates G1 and G2. A film presence/absence signal is supplied from the reflection photosensor 140 to the CPU 41. When the microfiche F is present, the CPU 41 causes a drive unit 26 to drive the first and second carrying members 13 and 16, so that the index frame of the microfiche is moved to the read position (i.e., the read position). However, when the microfiche F is not present, the CPU 41 causes the first and second carrying members 13 and 16 to move to the eject position. The CPU 41 then checks whether or not an index key 74 is depressed. When the CPU 41 detects that the index key 74 is depressed, the index frame of the microfiche F is moved to the read position. However, when the CPU 41 detects that any key excluding the index key 74 is depressed, the operation corresponding to the depressed key is performed under the control of the CPU 41.

In the above embodiment, the presence/absence of the microfiche F is detected by the reflection photosensor 140. However, the microfiche F can be detected by a transmission photosensor or a light-receiving element for receiving light from another light source. Furthermore, a projection lamp may be used as a light source, and a sensor may be arranged in the optical path of the reader or printer to detect an enlarged image, thereby detecting the presence/absence of the microfiche F. Alternatively, a microswitch may be used to detect the presence/absence of the microfiche F. In this case, the microswitch may be turned on upon insertion of the microfiche F or by the weight of the microfiche F.

In the above embodiment, the presence/absence of the microfiche F is detected after the first and second carrying members 13 and 16 are moved to the base position upon energization of the apparatus. In this case, the first and second carrying members are moved to the base position to allow easy film detection by the sensor 140. Therefore, the presence/absence of the film can be detected at another position.

The present invention has the arrangement and operation mode described above. The presence/absence of the microfiche is detected upon energization of the apparatus. When the microfiche is left on the driving means, a specific frame is projected. Otherwise, the eject operation is performed. Even if the operator carelessly leaves the microfiche on the driving means, the index frame is immediately projected upon energization of the apparatus, thereby indicating the presence of the microfiche and its classification. The subsequent operator will not insert a new microfiche when the used microfiche is left on the driving means. Furthermore, when th microfiche is not left on the driving means, the eject mode is immediately set, thereby increasing the retrieval speed.

What we claim is:

1. An image projection apparatus comprising:
   optical means for projecting an image recorded in a film onto a focusing position;
   a film carrier having a transparent base plate on which the film is placed and a press plate for pressing the film on said transparent base plate, said film carrier being movable in a direction perpendicular to an optical axis of said optical means;
   drive means for moving said press plate to either one of a closed position in which the press plate presses the film and an open position in which the press plate does not press the film;
   a power source switch; and
   drive control means for controlling said drive means so as to move said press plate to said closed position in response to switch-off of said power source switch.

2. An apparatus according to claim 1, wherein said drive means comprises moving means for moving said film carrier along a plane perpendicular to said optical axis, wherein said press plate is moved to either one of said closed and said open positions in synchronism with the movement of said film carrier.

3. An apparatus according to claim 2, wherein said moving means comprises a first motor for moving said film carrier in an X-direction along said plane and a second motor for moving said film carrier in a Y-direction along said plane.

4. An image projection apparatus comprising:
   optical means for projecting an image recorded in a film onto a focusing position;
   a film carrier having a transparent base plate on which the film is place, and a press plate for pressing the film on said transparent base plate, said film carrier being movable in a direction perpendicular to an optical axis of said optical means;
   detecting means for detecting whether the film is present on said film carrier;
   power source control means for controlling a power source of said apparatus such that power is intermitted in a case that said detecting means detects that no film is present, and such that power is not intermitted in a case that said detecting means detects that film is present;
   drive means for moving said press plate to either one of a first position in which said press plate overlays said base plate and a second position in which said press plate is kept apart from said base plate;
   measuring means for measuring a time when said press plate is apart from said base plate and generating an output signal when said measured time becomes a predetermines value; and
   drive control means for actuating said drive means such that said press plate overlays said base plate in response to the output signal from said measuring means, thereby preventing external foreign material from entering between said press plate and said base plate.

5. An apparatus according to claim 4, wherein said drive means further comprises moving means for moving said film carrier along a plane perpendicular to said optical axis, wherein said press plate is moved to either one of said first and second positions in synchronism with the movement of said film carrier.

6. An apparatus according to claim 5, wherein said moving means comprises a first motor for moving in an x-direction along said plane and a second motor for moving in a Y-direction along said plane.

7. An image projection apparatus comprising:
   optical means for projecting an image recorded in a film onto a focusing position;
   a film carrier having a transparent base plate on which the film is placed and a press plate for pressing the film on said transparent base plate, said film carrier being movable in a direction perpendicular to an optical axis of said optical means;

drive means for moving said press plate to either one of a closed position or an open position and including moving means for moving said film carrier along a plane perpendicular to said optical axis;

detecting means for detecting the presence or absence of film on said film carrier; and movement control means for controlling said moving means in accordance with an output from said detecting means such that when said film carrier is located at a predetermined position and said detecting means detects the absence of film, said film carrier is moved from said predetermined position to a first position, and that when said film carrier is located at said predetermined position and said detecting means detects the film, said film carrier is moved from said predetermined position to a second position, wherein when said film carrier is moved to said first position, said press plate is moved to said open position by said drive means, and when said film carrier is moved to said second position, a determined portion on the film is located in an optical path of said optical means.

8. An apparatus according to claim 7, wherein the determined portion on the film has retrieval information.

9. An apparatus according to claim 7, wherein said film carrier is placed at said predetermined position, said press plate is positioned at the closed position.

10. An apparatus according to claim 7, wherein said drive means moves said press plate to either one of said closed and open positions in synchronism with the movement of said film carrier.

11. A microfiche retrieval apparatus comprising:

a film holding member having a pair of transparent plates for clamping as microfiche therebetween, said film holding member being movable along a plane;

moving means for moving said film holding member such that a desired image of the microfiche held by said film holding member is located at a projection position;

opening and closing means for opening and closing said pair of transparent plates so as to be brought into an open state in which the microfiche may be introduced and removed and into a closed state in which the microfiche is clamped;

a power source switch; and means for controlling said opening and closing means so as to bring said pair of transparent plates into said closed state in response to switch -off of said power source switch.

12. An apparatus according to claim 11, further comprising means for controlling a power source of said apparatus such that power supply of said power source is intermitted when said pair of transparent plates have been brought into said close state after said power source switch is switched off.

13. A microfiche retrieval apparatus comprising:

a film holding member having a pair of transparent plates for clamping a microfiche therebetween, said film holding member being movable along a plane;

detecting means for detecting whether film is present on said film holding member;

power source control means for controlling a power source of said apparatus such that power is intermitted in a case that said detecting means detects that no film is present, and such that power is not intermitted in a case that said detecting means detects that film is present;

moving means for moving said film holding ember such that a desired image of the microfiche held by said film holding member is located at a projection position;

opening and closing means for opening and closing said pair of transparent plates to be brought into an open state in which the microfiche may be introduced and removed and into a closed state in which the microfiche is clamped;

measuring means for measuring a time when said pair of transparent plates are in said open state and generating an output signal when said measured time becomes a predetermined time; and means for actuating said opening and closing means so as to actuate said closing means in response to the output signal from said measuring means, thereby preventing external foreign material from entering between said pair of transparent plates, 14. An apparatus according to claim 13, further comprising means for controlling a power source of said apparatus such that power supply of said power source is intermitted when said pair of transparent of plates have been brought into said closed state in response to said signal.

15. A microfiche retrieval apparatus comprising:

a film holding member having a pair of transparent plates for clamping a microfiche therebetween said film holding member being movable along a plane;

moving means for moving said film holding member such that a selected image of the microfiche held by said film holding member is located at a projection position;

opening and closing means for opening and closing said pair of transparent plates so as to be brought into an open state in which the microfiche may be introduced and removed and into closed state in which a microfiche is clamped;

detecting means for detecting the presence or absence of the film on said film holding member; and control means for controlling said moving means in accordance with an output of said detecting means such that when said film holding means is located at a predetermined position and said detecting means detects the absence of microfiche, the film holding member is moved from said predetermined position to a first position, and that when said film holding means is located at said predetermined position and said detecting means detects the microfiche, the film holding member is moved from said predetermined position to a second position, wherein when said film holding member is moved to said first position said pair of transparent plates are brought into an open state by said opening and closing means and when said film holding member is moved to said second position, a determined portion on the film is positioned at said projecting position.

16. An apparatus according to claim 15, wherein when said film holding member is located at said predetermined position, said pair of transparent plates are in said closed state.

17. A sheet moving apparatus comprising:

sheet holding means for holding a sheet between a pair of plain plates;

moving means for moving said sheet holding means to either one of a first position in which said plain plates are open to introduce the sheet therebetween said remove the sheet therefrom, and a second position in which said plain plates are closed to clamp the sheet therebetween;

a power source switch; and means for causing said moving means to move said sheet holding means to said second position in response to a switch-off of said power source switch while said sheet holding means is located at said first position.

18. A sheet moving apparatus comprising:

a sheet holding member for holding a sheet between a pair of plain plates;

detecting means for detecting whether the sheet is present on said sheet holding member;

power source control means for controlling a power source of said apparatus such that power is intermitted in a case that said detecting means detects that no sheet is present, and such that power is not intermitted in a case that said detecting means detects that a sheet is present;

moving means for moving said sheet holding member to either one of a first position in which said plain plates are open to introduce the sheet therebetween and remove the sheet therefrom, and a second position in which said plain plates are closed to clamp the sheet therebetween;

measuring means for measuring a time when said plain plates are open and generating an output signal when the measured time becomes a predetermined time; and means for actuating said moving means such that said plain plates are closed in response to said output signal from said measuring means, thereby preventing external foreign material from entering between said plain plates.

19. A sheet moving apparatus comprising:

a sheet holding member for holding a sheet between a pair of plain plates;

moving means for moving said sheet holding member to either one of a first position in which said plain plates are opened to introduce the sheet therebetween, a second position in which said plain plates are closed to clamp the sheet between said plain plates, and a third position in which the sheet is available;

detecting means for detecting whether the sheet is placed on said sheet holding member located at said second position; and means for causing said moving means to move said sheet holding member such that when said detecting means detects the sheet, said sheet holding member is brought to said third position, and when said detecting means detects the absence of a sheet, said sheet holding member is moved to said first position.

* * * * *

UNITED STATES PATENT AND TRADEMARK OFFICE
CERTIFICATE OF CORRECTION

PATENT NO. : 4,830,484

DATED : May 16, 1989

INVENTOR(S) : YASUHIRO YAMAMOTO, ET AL.   Page 1 of 3

It is certified that error appears in the above-identified patent and that said Letters Patent is hereby corrected as shown below:

COLUMN 3

Line 43, "rod 14" should read --rod 14.--.

COLUMN 4

Line 11, "motor" should read --motors--.
    Line 66, "When" should read --With--.

COLUMN 5

Line 46, "add" should read --and--.

COLUMN 6

Line 7, "microfiche" should read --microfiche F--.

COLUMN 7

Line 17, "12 V" should read --+12 V--.

COLUMN 10

Line 39, "turned o" should read --turned on--.
    Line 45, "after" should read --after a--.

COLUMN 11

Line 10, "nd" should read --and--.
    Line 60, "th" should read --the--.

UNITED STATES PATENT AND TRADEMARK OFFICE
CERTIFICATE OF CORRECTION

PATENT NO. : 4,830,484
DATED : May 16, 1989
INVENTOR(S) : YASUHIRO YAMAMOTO, ET AL.

It is certified that error appears in the above-identified patent and that said Letters Patent is hereby corrected as shown below:

COLUMN 12

Line 28, "place," should read --placed,--.
    Line 47, "predetermines" should read --predetermined--.
    Line 62, "x-direction" should read --X-direction--.

COLUMN 13

Line 29, "wherein said" should read
        --wherein, when said--.
    Line 38, "as microfiche" should read --a microfiche--.
    Line 60, "close state" should read --closed state--.

COLUMN 14

Line 7, "ember" should read --member--.
    Line 24, "plates," should read --plates.--.
    Line 28, "of" (second occurrence) should be deleted.
    Line 33, "therebetween" should read --therebetween,--.
    Line 58, "position" should read --position,--.

UNITED STATES PATENT AND TRADEMARK OFFICE
CERTIFICATE OF CORRECTION

PATENT NO. : 4,830,484

DATED : May 16, 1989

INVENTOR(S) : YASUHIRO YAMAMOTO, ET AL.

It is certified that error appears in the above-identified patent and that said Letters Patent is hereby corrected as shown below:

COLUMN 15

Line 5, "open" should read --opened--.
    Line 6, "said" should read --and--.
    Line 31, "open" should read --opened--.

Signed and Sealed this

Eighth Day of October, 1991

Attest:

HARRY F. MANBECK, JR.

Attesting Officer

Commissioner of Patents and Trademarks